(12) United States Patent
Beuerle et al.

(10) Patent No.: US 12,030,474 B2
(45) Date of Patent: Jul. 9, 2024

(54) BRAKE PEDAL MODULE

(71) Applicant: ZF Active Safety GmbH, Koblenz (DE)

(72) Inventors: Christoph Beuerle, Koblenz (DE); Marcus Janson, Koblenz (DE)

(73) Assignee: ZF Active Safety GmbH, Koblenz (DE)

(*) Notice: Subject to any disclaimer, the term of this patent is extended or adjusted under 35 U.S.C. 154(b) by 0 days.

(21) Appl. No.: 17/868,350

(22) Filed: Jul. 19, 2022

(65) Prior Publication Data
US 2023/0034281 A1 Feb. 2, 2023

(30) Foreign Application Priority Data
Jul. 27, 2021 (DE) .......................... 102021119447.4

(51) Int. Cl.
*B60T 7/04* (2006.01)
*G05G 5/03* (2008.04)

(52) U.S. Cl.
CPC .............. *B60T 7/042* (2013.01); *G05G 5/03* (2013.01); *B60T 2220/04* (2013.01)

(58) Field of Classification Search
CPC ........ B60T 7/06; B60T 7/042; B60T 2220/04; B60T 2270/82; B60T 26/021; G05G 1/30; G05G 5/03; G05G 7/04
See application file for complete search history.

(56) References Cited

U.S. PATENT DOCUMENTS

| | | | | |
|---|---|---|---|---|
| 3,766,342 A | * | 10/1973 | Stadelmann | H01H 3/166 340/479 |
| 6,186,025 B1 | * | 2/2001 | Engelgau | B60T 7/065 74/513 |
| 6,253,635 B1 | * | 7/2001 | Huber | G05G 1/46 267/44 |
| 6,471,304 B1 | * | 10/2002 | Deml | B60T 8/3255 303/114.1 |
| 6,591,710 B1 | * | 7/2003 | Shaw | G05G 1/30 74/513 |
| 7,425,042 B2 | * | 9/2008 | Fujiwara | B60T 7/042 303/114.1 |
| 8,707,820 B2 | * | 4/2014 | Fujiwara | G01L 5/225 74/512 |

(Continued)

FOREIGN PATENT DOCUMENTS

| | | |
|---|---|---|
| DE | 19813845 A1 | 10/1999 |
| DE | 10335403 A1 | 3/2005 |

(Continued)

*Primary Examiner* — Thomas C Diaz
(74) *Attorney, Agent, or Firm* — Kristin L. Murphy

(57) ABSTRACT

A brake pedal module for a brake-by-wire brake system of a vehicle is disclosed. The brake pedal module includes a pivotably mounted brake pedal and a damping unit. The damping unit is mechanically coupled to the brake pedal to generate a resistance when the brake pedal is actuated. The brake pedal module comprises a sensor unit for detecting a braking intention of a driver. The sensor unit comprises at least one sensor for detecting an actuating travel, which is arranged on a pivot bearing of the brake pedal, and at least one further sensor for detecting an actuating force, which is arranged on a rear side of the brake pedal when considered in a plan view of an actuating surface of the brake pedal.

13 Claims, 3 Drawing Sheets

(56) References Cited

U.S. PATENT DOCUMENTS 8,911,027 B2 * 12/2014 Walser .................. B60T 13/586
                                                                    303/3
9,740,233 B2 * 8/2017 Fujiwara .................. G05G 1/38

FOREIGN PATENT DOCUMENTS

| DE | 10343137 A1 | 4/2005 |
| DE | 102014202872 A1 | 8/2015 |
| DE | 102017006742 A1 | 1/2018 |
| EP | 1038742 A2 | 9/2000 |
| EP | 3015327 B1 | 4/2017 |

* cited by examiner

BRAKE PEDAL MODULE

CROSS-REFERENCE TO RELATED APPLICATION

This application claims priority to German Patent Application No. 102021119447.4, filed Jul. 27, 2021, the disclosure of which is incorporated herein by reference in its entirety.

TECHNICAL FIELD

The disclosure relates to a brake pedal module for a "brake-by-wire" brake system of a vehicle.

BACKGROUND

In the case of "brake-by-wire" brake systems, a braking intention of a driver is detected electronically, and the brakes of the vehicle are actuated by one or more purely electric actuators. For this purpose, provision can be made for each of the brakes of the individual wheels to be assigned an electric-motor actuator, as known, for example, in the case of an "EMB" (electric-motor brake). However, provision can also be made for an electrohydraulic actuator to be activated centrally in order to actuate the brakes hydraulically in a conventional manner, as known, for example, in an "IBS" (integrated brake system). Furthermore, a "brake-by-wire" brake system can be embodied as a hybrid system in that the brakes of one vehicle axle, for example those of the front wheels, are assigned to an "IBS" and the brakes of another vehicle axle, for example those of the rear wheels, are each embodied as an "EMB".

Since in "brake-by-wire" brake systems there is generally no mechanical connection between a brake pedal and the brakes, a reaction behaviour of the brake pedal is simulated, e.g. hydraulically, for the driver. More precisely, a greater resistance acts with increasing travel when the brake pedal is actuated.

For the electronic detection of the braking intention, a sensor unit is usually provided, this sensor unit detecting the movement of a piston, for example.

SUMMARY

What is needed is reliable detection of a braking intention while at the same time allowing a compact design of a brake pedal module.

According to the disclosure, a brake pedal module for a brake-by-wire brake system of a vehicle, having a pivotably mounted brake pedal and having a damping unit, which is mechanically coupled to the brake pedal in order to generate a resistance when the brake pedal is actuated, wherein the brake pedal module comprises a sensor unit for detecting a braking intention of a driver. The sensor unit comprises at least one sensor for detecting an actuating travel, which is arranged on a pivot bearing of the brake pedal, and at least one further sensor for detecting an actuating force, which is arranged on a rear side of the brake pedal when considered in a plan view of an actuating surface of the brake pedal.

By detection of the actuating travel and the actuating force, a braking intention of a driver is detected in a redundant manner, thereby making it possible to determine a braking intention accurately and reliably.

If the sensors are arranged on the pivot bearing of the brake pedal and on the rear side of the brake pedal, a compact construction of the brake pedal is obtained. For example, no sensor is required on a housing of the damping unit.

Furthermore, it is possible to dispense with a force sensor on the front side of the brake pedal.

The sensor for detecting the actuating travel is an angle sensor, for example. An angle sensor can be used to measure a pivoting angle by which the brake pedal is pivoted during an actuation. On the basis of the length of the brake pedal and the pivoting angle, it is possible to calculate an actuating travel and also the speed of the actuation with which a driver depresses the brake pedal with their foot.

In order to calculate the actuating travel and the braking speed on the basis of a measured pivoting angle, an evaluation unit suitable for this purpose can be present.

In one exemplary arrangement, a pivot pin is integrally formed on the brake pedal and the angle sensor is fitted onto the hinge pin. As a result, the angle sensor can be mounted particularly easily. As soon as the brake pedal has been mounted, e.g. on a carrier component, the angle sensor is firmly fixed.

According to one exemplary arrangement, the brake pedal is formed by a strut, which, at a first end, has the actuating surface that can be actuated by a driver in order to signal a braking intention, and which is mounted pivotably at an end opposite the first end, wherein the sensor for detecting the actuating force is arranged between the ends. This likewise contributes to a compact construction of the brake pedal module.

The damping unit is coupled to the brake pedal. In one exemplary arrangement, an actuating tappet, wherein the actuating tappet is mounted in an articulated manner on the brake pedal couples the damping unit to the brake pedal. The sensor for detecting the actuating force is arranged at an articulation point of the actuating tappet on the brake pedal. The articulation point is the point at which the actuating tappet presses against the brake pedal, wherein the actuating tappet can be arranged directly or indirectly on the brake pedal. The sensor for detecting the actuating force is thus integrated in a mechanical chain of action between the brake pedal and the damping unit and can detect a force particularly well. For example, the sensor for detecting the actuating force is compressed between the brake pedal and the actuating tappet.

In one exemplary arrangement, the articulated mounting is implemented by a pivot joint or a ball-and-socket joint. As a result of the articulated connection between the actuating tappet and the brake pedal, a pivoting movement of the brake pedal can be converted into a purely linear movement of the actuating tappet.

A depression can be formed in the strut, in which depression the sensor for detecting the actuating force is accommodated, wherein the sensor is secured in the depression by a holding element. The holding element can likewise be arranged in the depression. In this way, the sensor for detecting the actuating force is well protected from damage. For example, in one exemplary arrangement, the sensor is surrounded on all sides by material, in particular by the brake pedal and by the holding element. Another advantage is that the sensor for detecting the actuating force can be pre-installed on the brake pedal by means of the holding element, thereby simplifying further assembly of the brake pedal module.

According to one exemplary arrangement, the actuating tappet is mounted in an articulated manner on the holding element. For example, one end of the actuating tappet can be clipped onto the holding element. The holding element thus holds both the sensor and the actuating tappet on the brake pedal.

The brake pedal can have two sections, which are movable relative to one another and are coupled to one another, wherein the two sections overlap in the longitudinal direction, and wherein a microswitch is arranged in a region of the overlap between the two sections. The microswitch detects when the driver brakes without detecting further information about a desired vehicle deceleration; this information is detected by the sensors for detecting the actuating travel and the actuating force. The microswitch forms what is referred to as a brake light switch. The microswitch allow for quick detection that a driver wishes to start a braking operation, whereupon the brake lights of the vehicle are switched on without delay.

According to an alternative arrangement, the brake pedal has two sections, which are movable relative to one another and are coupled to one another, wherein the two sections overlap in a longitudinal direction, and wherein the sensor for detecting an actuating force is arranged in the region of the overlap between the two sections. In this case, the sensor for detecting an actuating force at the articulation point of the actuating tappet on the brake pedal can be dispensed with.

The two sections of the brake pedal can be pivoted relative to one another by a maximum of 5°, for example. This enables the two sections to be coupled to one another in a particularly simple manner without the need for a complicated joint. For example, the two sections are connected to one another in one piece, wherein the mobility between the two sections is achieved by a reduced material thickness. Pivoting by a maximum of 5° is sufficient to reliably actuate the microswitch or the sensor for detecting the actuating force.

The brake pedal module according to the disclosure is suitable for use in a "brake-by-wire" brake system, which is equipped with "EMB" brakes and/or is designed as an "IBS" system.

BRIEF DESCRIPTION OF DRAWINGS

Further advantages and features of the disclosure will become apparent from the following description and from the accompanying drawings, to which reference is made. In the drawings.

DETAILED DESCRIPTION

Figure 1:
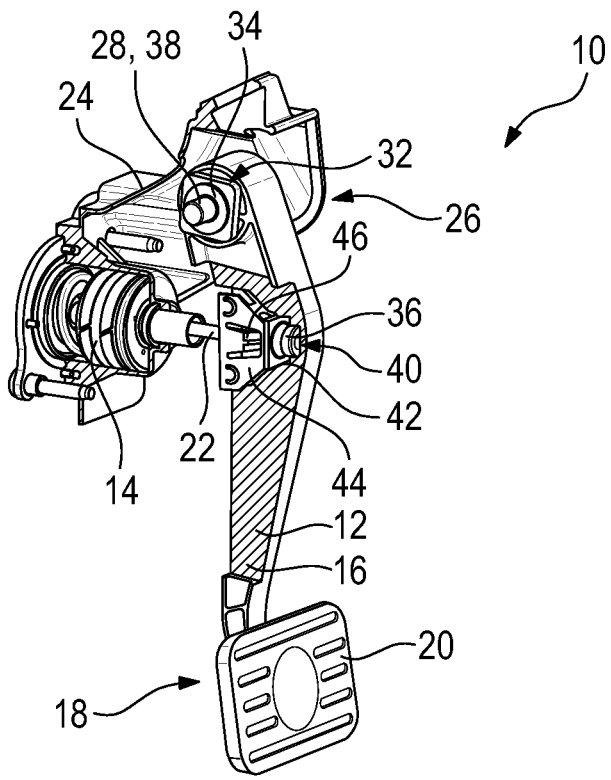
FIG. 1 shows a partial sectional illustration of a brake pedal module according to the disclosure in a perspective view.
Figure 2:
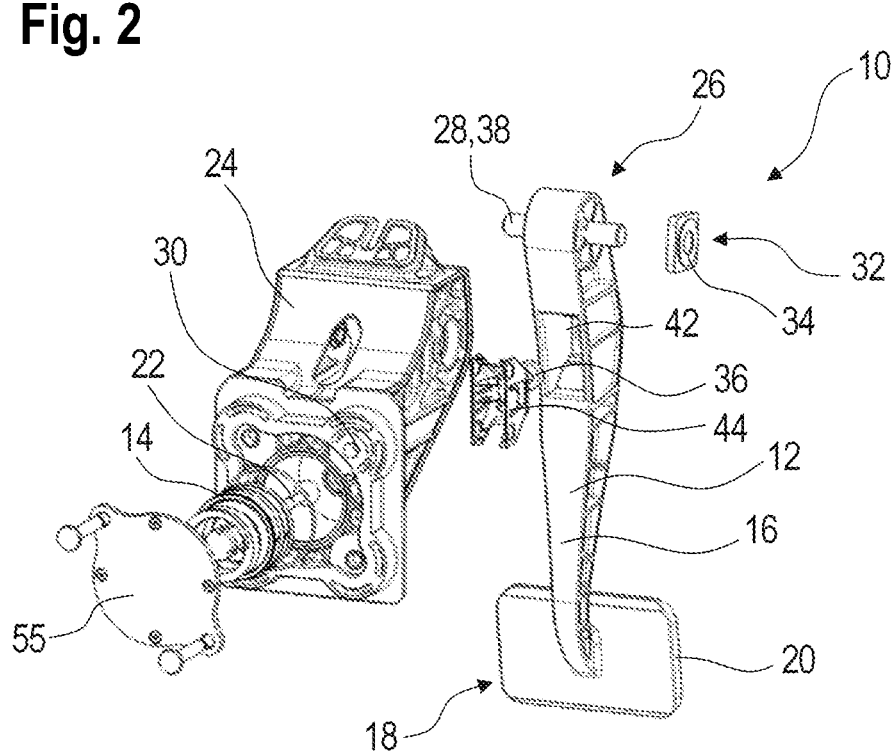
FIG. 2 shows an exploded illustration of the brake pedal module according to the disclosure from FIG. 1.

FIGS. 1 and 2 show a brake pedal module 10 for a "brake-by-wire" brake system of a vehicle, with FIG. 1 showing a partial sectional illustration in a perspective view and FIG. 2 showing an exploded illustration of the brake pedal module 10.

In particular, the brake pedal module 10 serves to electronically detect a braking intention of a driver.

The brake pedal module 10 comprises a pivotably mounted brake pedal 12 and a damping unit 14, which is mechanically coupled to the brake pedal 12. More precisely, the damping unit 14 is coupled to the brake pedal 12 between the ends thereof.

The damping unit 14 is used to generate a resistance when the brake pedal 12 is actuated.

When the brake pedal 12 is actuated, the damping unit 14 is subjected to compression.

The brake pedal 12 is formed by a strut 16.

At a first end 18, the strut 16 has an actuating surface 20, which can be pressed by a driver to signal a braking intention. In other words, a driver can exert a pressure on the actuating surface 20 with the foot to signal a braking intention.

The damping unit 14 is coupled to the brake pedal 12 by an actuating tappet 22, wherein the actuating tappet 22 is mounted in an articulated manner on the brake pedal 12.

The brake pedal module 10 furthermore has a carrier component 24, which is used to secure the brake pedal module 10 on the vehicle.

The other components of the brake pedal module 10 are pre-installed on the carrier component 24. This means that when the brake pedal module 10 is mounted in an installation space environment, only the carrier component 24 has be secured on the vehicle.

The brake pedal 12 is pivotably mounted on the carrier component 24, namely by an end 26 opposite the first end 18.

More precisely, the brake pedal 12 is mounted on the carrier component 24 in a pivot bearing 28, in one exemplary arrangement, in a pivot joint.

In one exemplary arrangement, the carrier component 24 is formed in one piece, for example as an injection-moulded plastic part. However, a multi-part design is also conceivable.

The brake pedal module 10 is a pre-assembled structural unit which is self-contained in terms of forces. This means that the brake pedal module 10 represents an independent, functional unit which is mounted on the vehicle as a whole, more specifically via the carrier component 24. If the brake pedal is moved in the uninstalled state outside the vehicle, it is possible to carry out all of its movements which are also possible in the installed state because the structural unit is already self-contained beforehand in terms of forces. Consequently, the brake pedal module 10 can be arranged in an installation space environment in a particularly simple and flexible manner.

For easy fastening, screw lugs 30 are integrally formed on the carrier component 24 (see FIG. 2).

The brake pedal module 10 furthermore comprises a sensor unit 32 for detecting a braking intention of a driver.

The sensor unit 32 comprises a sensor 34 for detecting an actuating travel and a sensor 36 for detecting an actuating force.

The sensor 34 for detecting the actuating travel is arranged at the pivot bearing 28 at end 26 of the brake pedal 12.

In one exemplary arrangement, the sensor 34 for detecting the actuating travel is fitted onto a pivot pin 38, which is integrally formed on end 26 of the brake pedal 12.

In one exemplary arrangement, the sensor 34 for detecting the actuating travel is an angle sensor.

The sensor 36 for detecting an actuating force is arranged on a rear side of the brake pedal 12, when considered in a plan view of the actuating surface 20 of the brake pedal 12.

In this case, the sensor 36 for detecting an actuating force is arranged between the ends 18, 26.

In one exemplary arrangement, the sensor 36 for detecting an actuating force is arranged on the brake pedal 12 at an articulation point 40 of the actuating tappet 22.

In order to reliably hold the sensor 36 for detecting an actuating force on the brake pedal 12, a depression 42 is formed in the strut 16, in which depression the sensor 36 for detecting the actuating force is accommodated.

A holding element 44, by which the sensor 36 is secured in the depression 42, is inserted into the depression 42.

The holding element 44 is clamped in the depression, e.g. by frictional and/or non-positive engagement.

The actuating tappet 22 of the damping unit 14 is mounted in an articulated manner on the holding element 44.

For this purpose, the holding element 44 comprises two flexible holding arms 46, by which the actuating tappet 22 is clipped onto the holding element 44.

Figure 3:
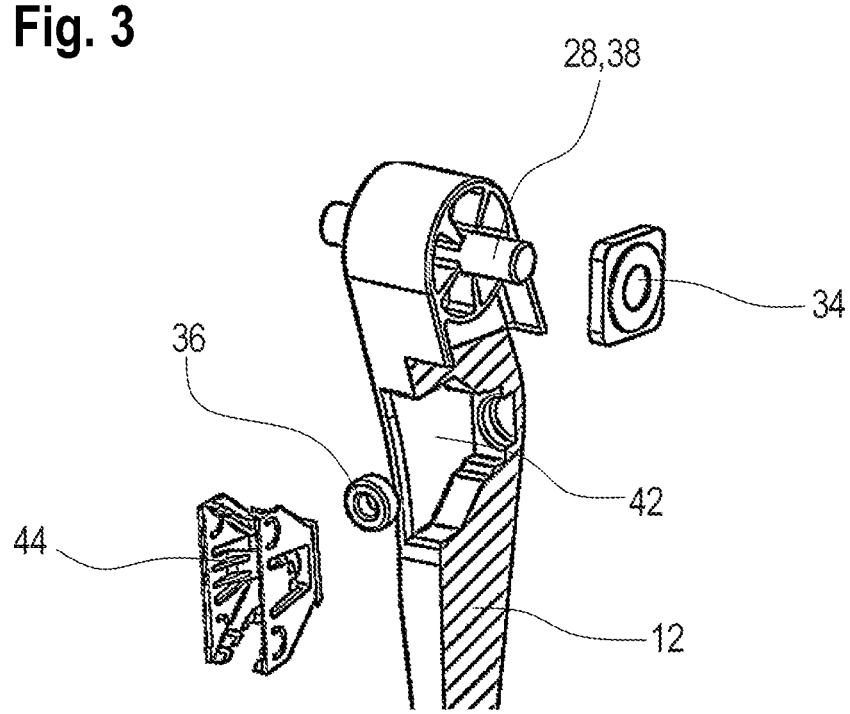
FIG. 3 shows an exploded illustration of part of the brake pedal module according to the disclosure from FIG. 1.

FIG. 3 illustrates the mounting of the sensors 34, 36 on the basis of a further exploded illustration. The shape of the depression 42 can be seen particularly clearly from FIG. 3.

Figure 4:
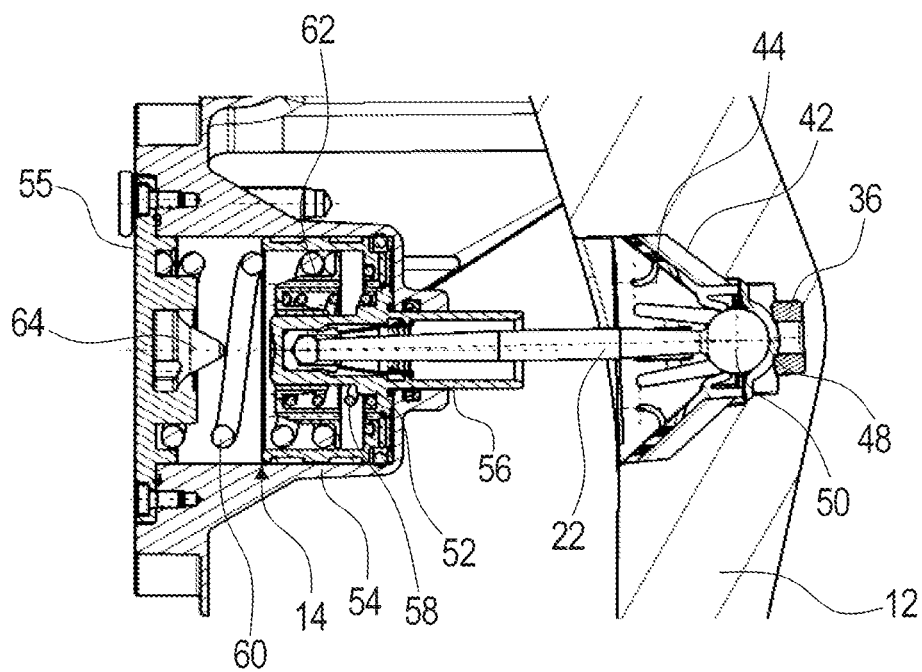
FIG. 4 shows part of the brake pedal module from FIG. 1 in a sectional illustration.

FIG. 4 shows a sectional illustration of part of the brake pedal module 10.

It can be seen in FIG. 4 that the holding element 44 has formed in it a bearing shell 48 in which a spherical head 50 of the actuating tappet 22 is accommodated. As a result, the actuating tappet 22 is guided in a sufficiently stable manner on the holding element 44.

With a side facing away from the actuating tappet 22, the holding element 44 abuts the sensor 36 for detecting the actuating force.

When the brake pedal 12 is actuated, a pressure is thus exerted on the sensor 36 for detecting the actuating force.

To allow reliable detection of the actuating force, the holding element 44 must be mounted with a certain amount of play in the actuating direction. Only in this way can a pressure during the actuation of the brake pedal be transmitted sufficiently strongly to the sensor 36 for detecting the actuating force. In other words, the actuating force must not be absorbed predominantly by the holding element 44.

The sectional illustration furthermore illustrates the structure of an exemplary damping unit 14.

As can be seen in the sectional view in FIG. 4, the damping unit comprises a piston 52. Said piston is movably mounted in a housing 54.

The housing 54 is closed by a cover 55.

In the exemplary arrangement, the housing 54 is formed in one piece with the carrier component 24. However, it is also possible for the housing 54 of the damping unit 14 to be formed separately and secured on the carrier component 24.

The actuating tappet 22 is supported on the piston 52.

A piston rod 56, in which a section of the actuating tappet 22 is accommodated, is integrally formed on the piston 52.

It is furthermore apparent from the sectional illustration in FIG. 4 that the damping unit 14 comprises two elastic elements 58, 60. The elastic elements 58, 60 are arranged in series.

The two elastic elements 58, 60 arranged in series are supported on one another via a supporting element 62.

To be more precise, the two elastic elements 58, 60 rest against opposite ends of the supporting element 62.

The piston 52 is supported on the elastic elements 58, 60.

When the brake pedal 12 is actuated, the piston 52 is moved in the housing 54 and compresses the elastic elements 58, 60.

The force which is necessary to compress the elastic elements 58, 60 is perceived by a driver as a resistance at the brake pedal.

The elastic elements 58, 60 also serve as restoring elements to move the piston 52 back into its initial position after actuation of the brake pedal 12.

In addition, a further elastic element 64 is arranged on the cover 55, which, when the cover 55 is secured, is arranged in the interior of the housing 54 and which is part of the damping unit 14.

The further elastic element 64 is arranged parallel to the two elastic elements 58, 60 arranged in series.

The elastic elements 58, 60 arranged in series are designed as helical springs, while the further elastic element on the cover 55 is a rubber damper.

Figure 5:
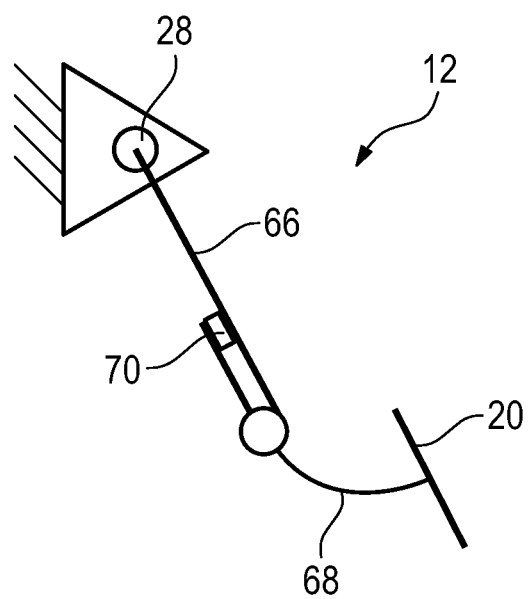
FIG. 5 shows schematically a brake pedal for a brake pedal module according to the disclosure.

FIG. 5 schematically illustrates a brake pedal 12 that can be used in a brake pedal module 10 instead of the brake pedal 12 illustrated in FIGS. 1 to 4.

The brake pedal 12 has two sections 66, 68, which are movable relative to one another and are coupled to one another, the two sections 66, 68 overlapping in the longitudinal direction.

The two sections 66, 68 can be pivoted relative to one another, for example by a maximum of 5°, this being achieved by a reduced material thickness, for example.

According to one exemplary arrangement, a microswitch 70 is arranged in the region of the overlap between the two sections 66, 68. When the brake pedal 12 is actuated, the microswitch 70 detects a braking intention of the driver without detecting an actuating force. In particular, the microswitch 70 is present in addition to the sensors 34, 36 described in conjunction with FIGS. 1 to 4.

As an alternative, however, it is also possible for the sensor 36 for detecting the actuating force to be arranged in the region of the overlap between the two sections 66, 68, instead of the microswitch 70.

In this case, the sensor at the articulation point 40 can be dispensed with.

The invention claimed is:

1. A brake pedal module for a brake-by-wire brake system of a vehicle, comprising a pivotably mounted brake pedal and a damping unit, wherein the damping unit is mechanically coupled to the brake pedal in order to generate a resistance when the brake pedal is actuated, wherein the brake pedal module comprises a sensor unit for detecting a braking intention of a driver, wherein the sensor unit comprises at least one sensor for detecting an actuating travel arranged on a pivot bearing of the brake pedal, and at least one further sensor for detecting an actuating force arranged on a rear side of the brake pedal of an actuating surface of the brake pedal, wherein the brake pedal comprises a strut, the strut including a first end comprising the actuating surface that can be actuated by the driver, wherein the strut is mounted pivotably at an second end opposite the first end, wherein the sensor for detecting the actuating force is arranged between the first end and the second end, wherein the strut forms a depression arranged to accommodate the sensor for detecting actuating force for detecting the actuating force, wherein the sensor is secured in the depression by a holding element, wherein the holding element includes a bearing shell configured to accommodate a portion of an actuating tappet.

2. The brake pedal module according to claim 1, wherein the sensor for detecting the actuating travel is an angle sensor.

3. The brake pedal module according to claim 2, wherein a pivot pin is integrally formed on the brake pedal, and the angle sensor is fitted onto the pivot pin.

4. The brake pedal module according to claim 1, wherein the damping unit is coupled to the brake pedal by the actuating tappet, wherein the actuating tappet is mounted in an articulated manner on the brake pedal, and wherein the sensor for detecting the actuating force is arranged at an articulation point of the actuating tappet on the brake pedal.

5. The brake pedal module according to claim 1, wherein the actuating tappet is mounted in an articulated manner on the holding element, wherein the bearing shell is configured to accommodate a spherical head portion of the actuating tappet.

6. The brake pedal module according to claim 1, wherein the brake pedal has two sections which are movable relative to one another and are coupled to one another.

7. The brake pedal module according to claim 6, wherein the two sections of the brake pedal can be pivoted relative to one another by a maximum of 5°.

8. The brake pedal module according to claim 6, wherein the two sections overlap in the longitudinal direction, and wherein a microswitch is arranged in the region of the overlap between the two sections.

9. The brake pedal module according to claim 1, wherein the brake pedal has two sections, which are movable relative to one another and are coupled to one another, wherein the two sections overlap in the longitudinal direction, and wherein the sensor for detecting an actuating force is arranged in the region of the overlap between the two sections.

10. The brake pedal module according to claim 9, wherein the two sections of the brake pedal can be pivoted relative to one another by a maximum of 5°.

11. The brake pedal module according to claim 1, wherein the brake pedal has two sections, which are movable relative to one another and are coupled to one another, wherein the two sections overlap in the longitudinal direction, and wherein the sensor for detecting an actuating force is arranged in the region of the overlap between the two sections.

12. A brake pedal module for a brake-by-wire brake system of a vehicle, comprising:
a pivotably mounted brake pedal; and
a damping unit, wherein the damping unit is mechanically coupled to the brake pedal in order to generate a resistance when the brake pedal is actuated, wherein the brake pedal module comprises a sensor unit for detecting a braking intention of a driver, wherein the sensor unit comprises at least one sensor for detecting an actuating travel arranged on a pivot bearing of the brake pedal, and at least one further sensor for detecting an actuating force arranged on a rear side of the brake pedal of an actuating surface of the brake pedal,
wherein the brake pedal comprises a strut, the strut including a first end comprising the actuating surface that can be actuated by the driver, wherein the strut is mounted pivotably at a second end opposite the first end,
wherein the strut forms a depression arranged to accommodate the sensor for detecting the actuating force, wherein the sensor for detecting the actuating force is disposed within the depression via a holding element, wherein the holding element includes a bearing portion configured to accommodate a portion of an actuating tappet.

13. The brake pedal module according to claim 12, wherein the damping unit is mechanically coupled to the brake pedal via the actuating tappet, the actuating tappet extending outwardly from a head portion, the actuating tappet extending outwardly opposite of an actuating surface of the brake pedal, wherein the head portion received within the bearing portion of the holding element, wherein the actuating surface comprises a surface in which the driver exerts pressure for braking.

* * * * *